United States Patent Office 3,401,031
Patented Sept. 10, 1968

3,401,031
MONOFLUOROPHENYL-4'-NITROPHENYLETHER DERIVATIVES AS HERBICIDES
Takayuki Inoue, Kichiro Kato, Hiroshi Fujita, Yukio Kiyohisa, Teruhiko Toyama, and Takeo Yoshimoto, Ohmuta-shi, Japan, assignors to Mitsui Kagaku Kogyo Kabushiki Kaisha (Mitsui Chemical Industry Co., Ltd.), Tokyo, Japan, a corporation of Japan
No Drawing. Filed Apr. 11, 1966, Ser. No. 541,525
Claims priority, application Japan, Apr. 15, 1965, 40/21,849
5 Claims. (Cl. 71—124)

ABSTRACT OF THE DISCLOSURE

A method of inhibiting the growth of weeds which comprises applying to the locus to be protected a herbicidal amount of a compound of the general formula:

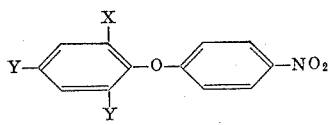

wherein X is selected from the group consisting of hydrogen and chlorine and of the two Y's, one is chlorine and the other is fluorine.

---

This invention relates to herbicides containing as its active component at least one monofluorophenyl-4'-nitrophenylether derivative of the formula

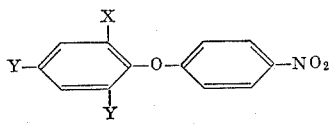

wherein X is a member selected from the group consisting of hydrogen and chlorine, and of the two Y's, one is chlorine and the other is fluorine.

It is known that there are compounds among the diphenylether derivatives which exhibit outstanding herbicidal activity, and those compositions containing either 2,4-dichlorophenyl-4'-nitrophenylether or 2,4,6-trichlorophenyl-4'-nitrophenylether as the active component are becoming popular as herbicides. We prepared various compounds having structures in which the fluorine atom was substituted for the chlorine atom of these two compounds and tested the resulting compounds for their herbicidal activity. As a consequence, we found that outstanding herbicidal activity was possessed by the monofluorodiphenylether derivatives represented by the hereinbefore given formula, i.e., the following four compounds:

(1) 2-chloro-4-fluorophenyl-4'-nitrophenylether,
(2) 2-fluoro-4-chlorophenyl-4'-nitrophenylether,
(3) 2,4-dichloro-6-fluorophenyl-4'-nitrophenylether, and
(4) 2,6-dichloro-4-fluorophenyl-4'-nitrophenylether.

Interest has been shown and studies have been made for a long time concerning the matter as to what changes in activity would occur in the case fluorine is introduced into a chlorine-containing compound having biological activity with respect to plant life. For instance, it is known that the chloro-phenoxy or chloro and methyl-phenoxy acetic acids such as 2,4-dichlorophenoxyacetic acid (2,4-D), 2,4,5-trichlorophenoxyacetic acid (2,4,5-T) and 2-methyl-4-chlorophenoxyacetic acid (MCP) have high activity, but that the activity of the fluoro-phenoxyacetic acids are much less than that of the chlorine-substituted products. It is also known that trifluoromethylphenoxyacetic acid having a fluorine atom in the side chain in the 3-position of the benzene nucleus has some activity, that 3-trifluoromethyl-4'-nitrodiphenylether has activity as a herbicide, and that the group of compounds having the 4-trifluoromethyl-2-nitrophenoxy structure inhibit the growth of plant life. However, in the case of the compounds in which fluorine has been directly introduced into the phenyl group, there are none so far which have been put to practical use, for the reasons that either they hardly possessed any biological activity with respect to plant life, or their activity was weak, or they were lacking in their qualification as herbicides.

We synthesized various diphenylether compounds in which fluorine atom was directly introduced into the benzene nucleus not possessing a nitro radical of the nitrodiphenylether. Upon investigating the herbicidal power of these compounds, a new fact was discovered in complete contradiction of what would have been expected from the hitherto known facts; namely that, as compared with the diphenylether compounds in which only chlorine atoms were introduced, the diphenylether compounds in which a fluorine and chlorine atom had been directly introduced simultaneously to the benzene nucleus not possessing the nitro radical, i.e., the aforesaid four compounds, had a comparable, if not much higher, activity and exhibited a potent herbicidal action.

All of these compounds of this invention are new compounds which have not been reported as yet in any literature and details as to their method of synthesis are not known. They can be synthesized however by a method corresponding to the synthesis of diphenylether compounds, i.e., by the condensation reaction of an alkali metal salt of chlorofluorophenol and a p-halonitrobenzene. In this case, when either p-chloronitrobenzene or p-bromonitrobenzene, which is usually used for this type of reaction, is used, the reaction is rendered difficult, but good results are obtained when p-fluoronitrobenzene is used. For removing the intended compound from the condensation products obtained after the reaction, the customary separation and purification procedures can be adopted, for example, the procedures either of extraction and recrystallization with a solvent or of distillation under reduced pressure.

Next will be given examples describing the synthesis of the invention compounds. All parts in the examples are on a weight basis.

EXAMPLE OF SYNTHESIS 1

Synthesis of 2-chloro-4-fluorophenyl-4'-nitrophenylether.

125 parts (1 mol) of aqueous 45% caustic potash solution are placed in a glass reactor, and after heating to 40–50° C., 147 parts (1 mol) of 2-chloro-4-fluorophenol are added within 15 minutes, with stirring. Heat is evolved and a potassium salt of 2-chloro-4-fluorophenol is formed, the temperature rising to the neighborhood of 70–80° C. While maintaining this temperature, a major portion of the water is distilled off under reduced pressure, after which 2 parts (0.0315 mol) of copper powder are added and further 353 parts (2.5 mols) of p-fluoronitrobenzene are added within 1.5 hours. The temperature of reaction mixture is then raised to 130° C. over a 2 hour period, and the reaction is carried out for 8 hours at this temperature. The water remaining is completely eliminated during the step of raising the temperature.

The reaction mixture is steam distilled to distill off the unreacted p-fluoronitrobenzene. After washing the residue with alkaline water, then water-washing and drying, it is recrystallized from ethanol once to obtain 215 parts (80.5% of theory) of yellow-tinged crystals having a melting point of 81.2–84.2° C.

The elemental analysis of these crystals was Cl, 12.91%; N, 4.98%; F, 6.88% (the theory for $C_{12}H_7ClFNO_3$ being Cl, 13.24%; N, 5.23%; F, 7.10%).

EXAMPLE OF SYNTHESIS 2

Synthesis of 2-fluoro-4-chlorophenyl-4'-nitrophenyl-ether.

147 parts (1 mol) of 2-fluoro-4-chlorophenol, 125 parts (1 mol) of aqueous 45% caustic potash solution, 353 parts (2.5 mols) of p-fluoronitrobenzene and 2 parts (0.0315 mol) of copper powder are treated as in example of Synthesis 1, followed by distilling the product under reduced pressure (4 mm. Hg) to obtain 180 parts (97.5% of theory) of a yellow-tinged liquid having a boiling point of 165–170° C.

The elemental content of this liquid compound was as follows: Cl, 12.89%; N, 4.97%; F, 6.82% (the theory for $C_{12}H_7ClFNO_3$ being Cl, 13.24%; N, 5.23%; F, 7.10%).

EXAMPLE OF SYNTHESIS 3

Synthesis of 2,4-dichloro-6-fluorophenyl-4'-nitrophenyl-ether.

125 parts (1 mol) of aqueous 45% caustic potash solution are placed in a glass reactor, followed by heating to 40–50° C. and then adding within 15 minutes 181 parts (1 mol) of 2,4-dichloro-6-fluorophenol, with stirring. Heat is evolved and the temperature of this reaction mixture rises to the neighborhood of 70–80° C. While maintaining this temperature, a major portion of the water is distilled off under reduced pressure, followed by adding 2 parts (0.0315 mol) of copper powder and further adding within 1.5 hours 353 parts (2.5 mols) of p-fluoronitrobenzene. The temperature of reaction mixture is raised to 150° C. over a period of 2 hours, after which the reaction is carried out for 8 hours at this temperature. The water remaining is completely eliminated during this step of raising the temperature.

The reaction mixture is then subjected to steam distillation to distill off the unreacted p-fluoronitrobenzene, after which the residue is washed in alkaline water, water-washed and dried. The reaction product is purified by distillation under reduced pressure (180–187° C./4 mm. Hg) to yield 238 parts (78.7% of theory) of yellow-tinged crystals having a melting point of 65.2–66.5° C.

These crystals had the following elemental analysis: Cl 23.27%; N, 4.21%; F, 6.01% (the theory for $C_{12}H_6Cl_2FNO_3$ being Cl, 23.47%; N, 4.64%; F, 6.29%).

EXAMPLE OF SYNTHESIS 4

Synthesis of 2,6-dichloro-4-fluorophenyl-4'-nitrophenyl-ether.

181 parts (1 mol) of 2,6-dichloro-4-fluorophenol, 125 parts (1 mol) of aqueous 45% caustic potash solution, 353 parts (2.5 mol) of p-fluoronitrobenzene and 2 parts (0.0315 mol) of copper powder are treated as in example of Synthesis 3 excepting that a reaction temperature of 130° C. is employed. The reaction product is recrystallized from ethanol to yield 221 parts (73.4% of theory) of yellow-tinged crystals having a melting point of 124–125° C.

The elemental analysis of these crystals was Cl, 23.10%; N, 4.41%; F, 6.08% (theory for $C_{12}H_6Cl_2FNO_3$ being Cl, 23.47%; N, 4.64%; F, 6.29%).

The herbicidal activity of these new compounds, which are the active components of the invention herbicides, are shown by Test 1, while toxicity thereof to fresh water fish is shown by Test 2.

Test 1.—A wettable powder containing each of the compounds was prepared by blending with a surfactant and clay. 3 ml. of a suspension of each of these, which were diluted with water to the various concentrations indicated in Table I, were poured into a Petri dish on whose bottom was laid a filter paper. 25 seeds each of barnyard grass and rape were sown on the surface of the filter paper, following which the seeds were maintained in a state of contact with the chemical liquid for 7 days while maintaining the temperature at 28° C. After 7 days had elapsed, the degree of inhibition for germination and growth of barnyard grass and rape was determined. The results shown in Table I were obtained. The degree of inhibition was indicated with a six-step rating from 0 to 5, 0 denoting the instance where the degree of germination and growth was equal to that of the control (water) and 5 denoting the instance where the inhibiting action was practically perfect. In this test, the barnyard grass was chosen as being representative of the monocotyledon, while rape was chosen as being representative of the dicotyledon.

Test 2.—5 ml. of solution containing each of the compounds prepared by dissolving in acetone were each poured into 5000 ml. of river water, then stirred well to reach the concentrations indicated in Table I. In each of these were placed five scarlet crucian carp, after which the river water solutions were allowed to stand still at 15° C., the number of dead fish after one day and after three days being examined. The rate of dead fish obtained after repeating the test twice are shown in Table I.

TABLE I

| Herbicidal Compound | Plant | Degree of growth inhibition at the various concentrations (p.p.m. of Compounds) | | | | Rate of dead fish (percent) at the various concentrations (p.p.m. of compounds) | | |
|---|---|---|---|---|---|---|---|---|
| | | 100 | 30 | 10 | 3 | Days elapsed | 30 | 3 |
| (1) 2-chloro-4-fluorophenyl-4'-nitrophenylether | Barnyard grass | 5 | 5 | 2 | 1 | 1 | 0 | 0 |
| | Rape | 5 | 5 | 1 | 0 | 3 | 0 | 0 |
| (2) 2-fluoro-4-chlorophenyl-4'-nitrophenylether | Barnyard grass | 5 | 5 | 2 | 1 | 1 | 100 | 0 |
| | Rape | 5 | 4 | 2 | 0 | 3 | 100 | 0 |
| (3) 2,4-dichloro-6-fluorophenyl-4'-nitrophenylether | Barnyard grass | 5 | 5 | 5 | 4 | 1 | 0 | 0 |
| | Rape | 5 | 5 | 4 | 3 | 3 | 0 | 0 |
| (4) 2,6-dichloro-4-fluorophenyl-4'-nitrophenylether | Barnyard grass | 5 | 5 | 3 | 1 | 1 | 0 | 0 |
| | Rape | 5 | 3 | 1 | 0 | 3 | 0 | 0 |
| (5) 2,4-dichlorophenyl-4'-nitrophenylether | Barnyard grass | 5 | 5 | 1 | 1 | 1 | 0 | 0 |
| | Rape | 5 | 3 | 1 | 0 | 3 | 0 | 0 |
| (6) 2,4,6-trichlorophenyl-4'-nitrophenylether | Barnyard | 5 | 5 | 0 | 1 | 1 | 0 | 0 |
| | Rape | 4 | 2 | 0 | 0 | 3 | 0 | 0 |
| (7) Not used | Barnyard grass | | | 0 | | 1 | 0 | |
| | Rape | | | 0 | | 3 | 0 | |

Note.—Compounds (1)–(4) are the herbicidal composition of this invention. Compounds (5) and (6) are the prior art herbicidal compositions.

As is apparent from the results of Tests 1 and 2, the invention compounds exhibit inhibiting effects to the monocotyledon and dicotyledon plants even at very low concentrations. Further, since they do not exhibit toxicity to fresh water fishes at such concentrations, they possess great utility. Hence these compounds are highly suitable as active components for selectively eradicating the weeds which grow among crops or for nonselectively eradicating all types of undesirable weeds. Moreover, the weed inhibiting action of these compounds are far greater than that of the conventional chlorine or bromine-substituted diphenylether compounds. For example, 2,4-dichloro-6-fluorophenyl-4'-nitrophenylether exhibits an inhibiting effect on the growth of barnyard grass as nearly 10 times strong as that of 2,4,6-trichlorophenyl-4'-nitrophenylether. Furthermore, there is no need at all to be concerned about the toxicity to fishes at the concentrations in which it is effective in inhibiting weed growth in practical uses.

In using the invention compounds as herbicides, they are blended with suitable inert carriers and are used in the usual forms in which agricultural chemicals are used, for example, in the form of such as dusts, granules, wettable powders, emulsions or solutions etc. The term "carrier," as here used, is meant to be a carrier for transporting the active component to the intended location. As solid carriers, included are, for example, bentonite, clay, talc and diatomaceous earth etc., while as liquid carriers those which can dissolve or disperse the invention compounds, such, for example, as benzene, alcohol, acetone and kerosene etc. can be used. Further, as adjuvants, the various surfactants can be used, such, for example, as sodium alkylarylsulfonate, sodium lignin sulfonate, polyoxyethleneaIkylaryl ether, and polyoxyethylene sorbitan alkylate etc. Again, fertilizers and biological active agents such as, insecticides, fungicides and other herbicides can be blended and used together with the invention compounds, if necessary.

In using the invention compounds as herbicides, it is preferred that a suitable amount ranging between 5 and 500 grams per 10 ares should be chosen according to the purpose and conditions of use, but the amount to be used is not necessarily limited to this range.

The following examples are given for further illustrating this invention, the parts used therein being on a weight basis.

Example 1

An emulsion is prepared by blending and dissolving the following components:

| | Parts |
|---|---|
| 2-chloro-4-fluorophenyl-4'-nitrophenylether | 30 |
| "Sorpol" 800A (an emulsifier produced by Toho Chemical Company, Japan) (blend of special nonionic surfactant and special anionic surfactant) | 10 |
| Xylene | 60 |

500 grams of this composition diluted with 150 liters of water were applied to a 10-are dry paddy field of direct sowing rice culture, after sowing. As a result, the germination of weeds was inhibited without injury to the germination and growth of the paddy rice during the dry field period.

Example 2

A wettable powder is prepared by mixing and grinding the following components:

| | Parts |
|---|---|
| 2-fluoro-4-chlorophenyl-4'-nitrophenylether | 25 |
| Sodium sulfonate of higher alcohol | 5 |
| Clay | 70 |

When 1000 grams of this composition were applied to a 10-are wheat field, the herbicidal action was great.

Example 3

| | Parts |
|---|---|
| 2,4-dichloro-6-fluorophenyl-4'-nitrophenylether | 1.5 |
| Sodium lignin sulfonate | 1.5 |
| Bentonite | 68 |
| Talc | 29 |

The foregoing components are mixed and ground, then extruded through nozzles 0.7 mm. in diameter in a state of about 20% water content, followed by drying and grinding to prepare a granule.

When this composition was applied at the rate of 3 kg. per 10 ares to a paddy field transplanted with rice seeding, on the 7th day after transplanting, there was practically no germination of such weeds as barnyard grass, nutsedge, tooth cup, pickered weed etc. even after 30 days had elapsed and growth of rice plant was normal Example 4

A dust is prepared by mixing and grinding the following components:

| | Parts |
|---|---|
| 2,6-dichloro-4-fluorophenyl-4'-nitrophenylether | 5 |
| Sodium alkylnaphthalene sulfonate | 5 |
| Talc | 50 |
| Clay | 40 |

2 kg. per 10 ares of this composition was applied with a duster to a wet paddy field of direct sowing rice culture on the 3rd day before sowing. As a result, the germination of various weeds were completely inhibited without injuring the germination and growth of the paddy rice.

Example 5

A mixture of one part of 2,4-dichloro-6-fluorophenyl-4'-nitrophenylether and one part of 2-fluoro-4-chlorophenyl-4'-nitrophenylether is melted intot a liquid, which is then sprayed onto 98 parts of granular urea to cover the surfaces of the latter, thus preparing a solid fertilizer.

This composition was applied at the rate of 5 kg. per 10 ares to a paddy field to which paddy rice seedling was transplanted, on the 10th day after transplanting. As a result, good effects were had on the growth of the rice plant in that not only fertilizing effects were had but also the germination of weeds was inhibited.

Example 6

| | Parts |
|---|---|
| 2,4,-dichloro-6-fluorophenyl-4'-nitrophenylether | 1 |
| 2,4,6-trichlorophenyl-4'-nitrophenylether | 5 |
| Benzene hexachloride (technical) | 40 |
| Alkylarylsulfonate | 4 |
| Bentonite | 30 |
| Talc | 20 |

The foregoing components were mixed and ground, after which this mixture, in a state of about 15% water content, was rolled and formed into thin pieces of 1–1.5 mm. thick followed by drying and grinding to prepare a 24–60 mesh finely divided granule.

When 3 kg. of this composition were applied to a 10-are paddy field on the 5th day after transplanting the rice seedlings, practically no damage due to 1st generation rice stem borer was noted, nor was there observed hardly any inhibition of the growth of the paddy rice due to the growth of various weeds.

We claim:

1. A method for inhibiting growth of weeds which comprises applying to the locus to be protected from weeds in an amount sufficient to exert herbicidal action thereon and at a rate from about 5–500 grams per 10 ares at least one compound having the general formula:

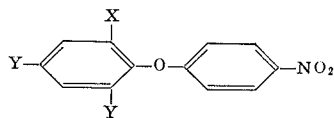

wherein X is selected from the group consisting of hydrogen and chlorine and of the two Y's, one is chlorine and the other is fluorine.

2. A method as claimed in claim 1, wherein said active component is 2-chloro-4-fluorophenyl-4'-nitrophenylether.

3. A method as claimed in claim 1 wherein said active component is 2-fluoro-4-chlorophenyl-4'-nitrophenylether.

4. A method as claimed in claim 1 wherein said active component is 2,4-dichloro-6-fluorophenyl-4'-nitrophenylether.

5. A method as claimed in claim 1 wherein said active component is 2,6-dichloro-4-fluorophenyl-4'-nitrophenyl ether.

References Cited

UNITED STATES PATENTS

| | | | |
|---|---|---|---|
| 2,726,946 | 12/1955 | Mussell | 71—124 |
| 3,080,225 | 3/1963 | Wilson et al. | 71—124 |
| 3,154,398 | 10/1964 | McRae | 71—124 |
| 3,231,358 | 1/1966 | Wilson et al. | 71—124 |
| 3,256,343 | 6/1966 | McCall et al. | 260—612 |
| 3,256,350 | 6/1966 | McCall et al. | 260—612 |
| 3,316,080 | 4/1967 | Inoue et al. | 71—124 |
| 3,131,166 | 4/1964 | Harris et al. | 71—76 |
| 3,223,516 | 12/1965 | Gilbert et al. | 71—122 |

FOREIGN PATENTS 1,476,163   2/1967   France.

LEWIS GOTTS, *Primary Examiner.*

G. HOLLRAH, *Assistant Examiner.*